United States Patent
Chen

(10) Patent No.: US 10,007,091 B2
(45) Date of Patent: Jun. 26, 2018

(54) LENS ASSEMBLY

(71) Applicants: AO Ether Optronics (Shenzhen) Limited, Shenzhen, Guandong Province (CN); AO Ether Corporation, Taichung (TW)

(72) Inventor: Yuan-Chen Chen, Taichung (TW)

(73) Assignees: AO ETHER OPTRONICS (SHENZHEN) LIMITED, Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 57 days.

(21) Appl. No.: 14/961,423

(22) Filed: Dec. 7, 2015

(65) Prior Publication Data

US 2016/0161721 A1   Jun. 9, 2016

(30) Foreign Application Priority Data

Dec. 8, 2014  (CN) .......................... 2014 1 0742324

(51) Int. Cl.
   *G02B 13/18*   (2006.01)
   *G02B 13/00*   (2006.01)

(52) U.S. Cl.
   CPC ............................... *G02B 13/0045* (2013.01)

(58) Field of Classification Search
   CPC ...................................................... G02B 98/62
   See application file for complete search history.

(56) References Cited

U.S. PATENT DOCUMENTS

| | | | |
|---|---|---|---|
| 8,717,685 B2* | 5/2014 | Tsai | G02B 13/0045 359/739 |
| 2014/0218582 A1* | 8/2014 | Chen | G02B 9/62 348/335 |

FOREIGN PATENT DOCUMENTS

| | | |
|---|---|---|
| CN | 104007532 A | 8/2014 |
| TW | 201331623 A | 8/2013 |

* cited by examiner

*Primary Examiner* — Robert E Tallman
(74) *Attorney, Agent, or Firm* — Birch, Stewart, Kolasch & Birch, LLP

(57) ABSTRACT

An image capturing lens assembly includes a first lens, a second lens, a third lens, a fourth lens, a fifth lens and a sixth lens, all of which are arranged in an order from an object side to an image side thereof. The first lens is with refractive power. The second lens is with refractive power. The third lens is with positive refractive power and has a convex surface facing the image side of the image capturing lens assembly. The fourth lens is with refractive power. The fifth lens is with refractive power. The sixth lens is with refractive power.

19 Claims, 16 Drawing Sheets

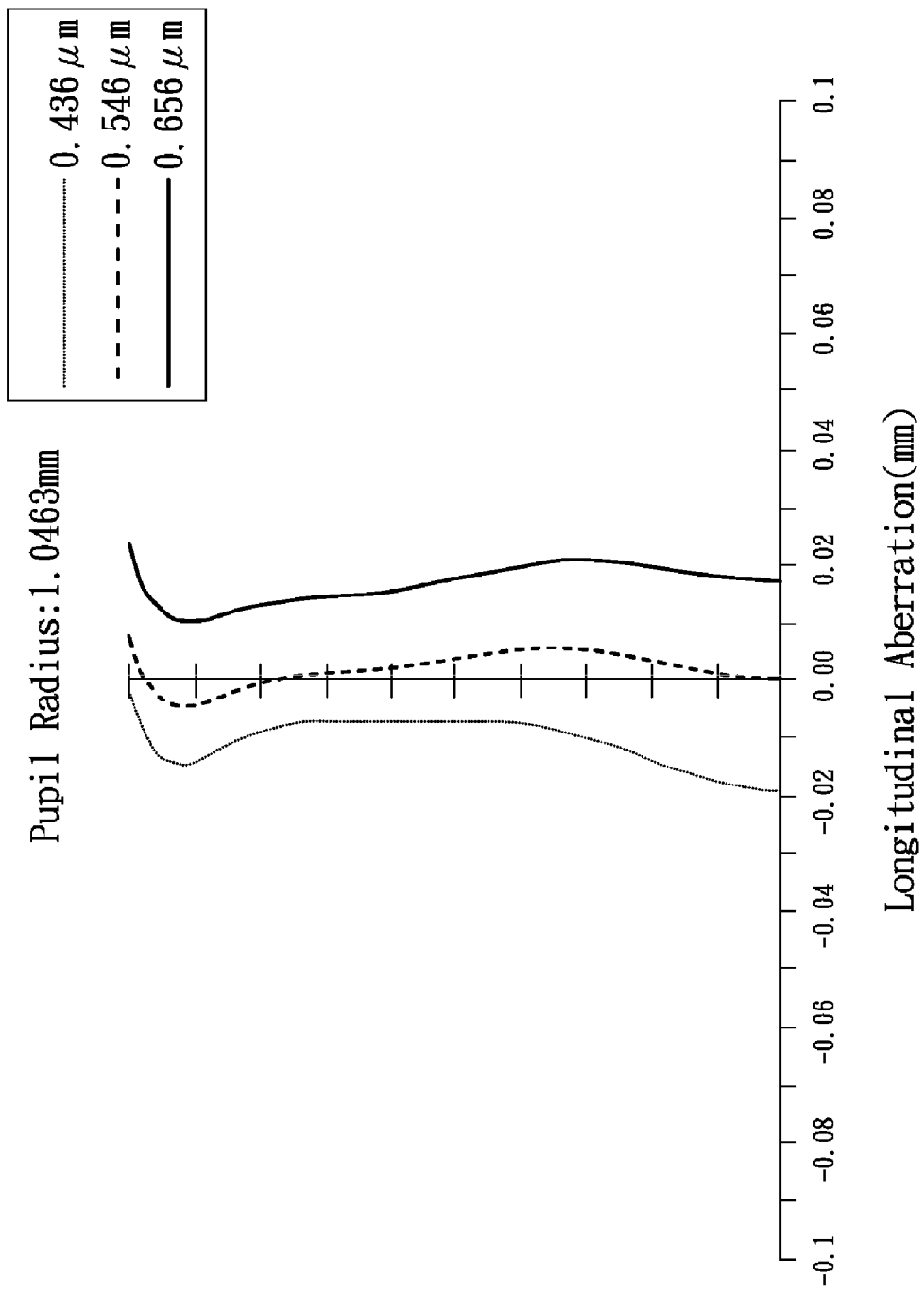

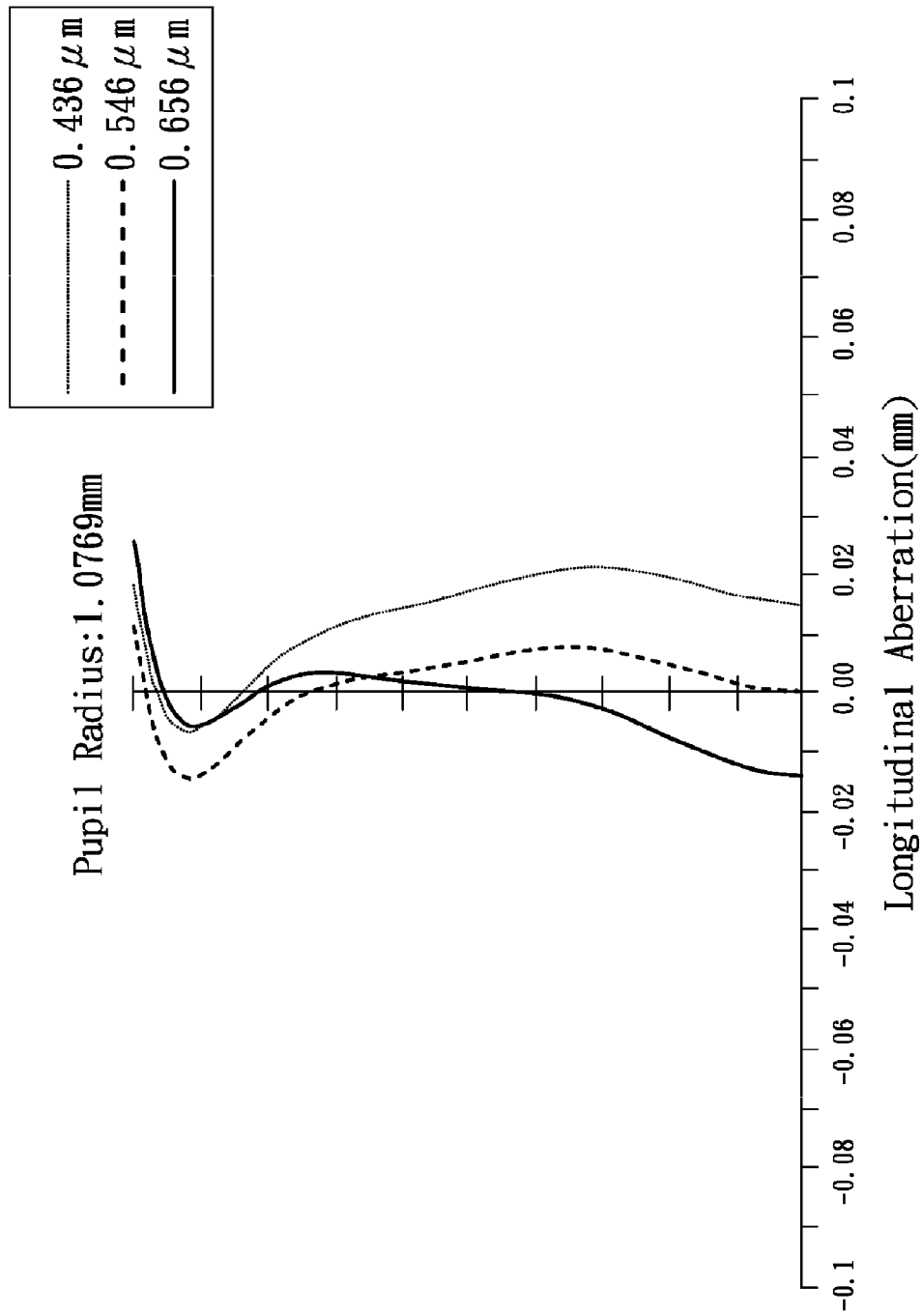

LENS ASSEMBLY

BACKGROUND OF THE INVENTION

Field of the Invention

The present invention relates to a lens assembly.

Description of the Related Art

In recent years, portable electronic products have been gradually developed toward miniaturization and lightweight for people to carry and use conveniently. The lens assemblies that are used for portable electronic products also require miniaturization and lightweight. In addition to miniaturization and lightweight, higher optical performance that can achieve high image quality is desired.

In order to achieve miniaturization, lightweight and high optical performance, the use of aspheric plastic lens for lens design has become a trend. However, only using aspheric plastic lens still has some drawbacks, including a longer total track length of a lens assembly and unsatisfactory resolution. Therefore, there is still a need to solve the aforementioned problems.

BRIEF SUMMARY OF THE INVENTION

The image capturing lens assembly comprises in an order from an object side to an image side thereof: a first lens element with refractive power, a second lens element with refractive power, a third lens element with positive refractive power and having a convex surface facing the image side of the image capturing lens assembly, a fourth lens element with refractive power, wherein $-0.967 \leq f3/f4 < -0.5$, where f3 is a focal length of the third lens element, and f4 is a focal length of the fourth lens element, a fifth lens element with refractive power, and a sixth lens element with refractive power.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A is a longitudinal spherical aberration diagram of an image capturing lens assembly in accordance with the first embodiment of the present invention;

FIG. 10A is a longitudinal spherical aberration diagram of an image capturing lens assembly in accordance with the second embodiment of the present invention.

DETAILED DESCRIPTION OF THE INVENTION

Figure 1:
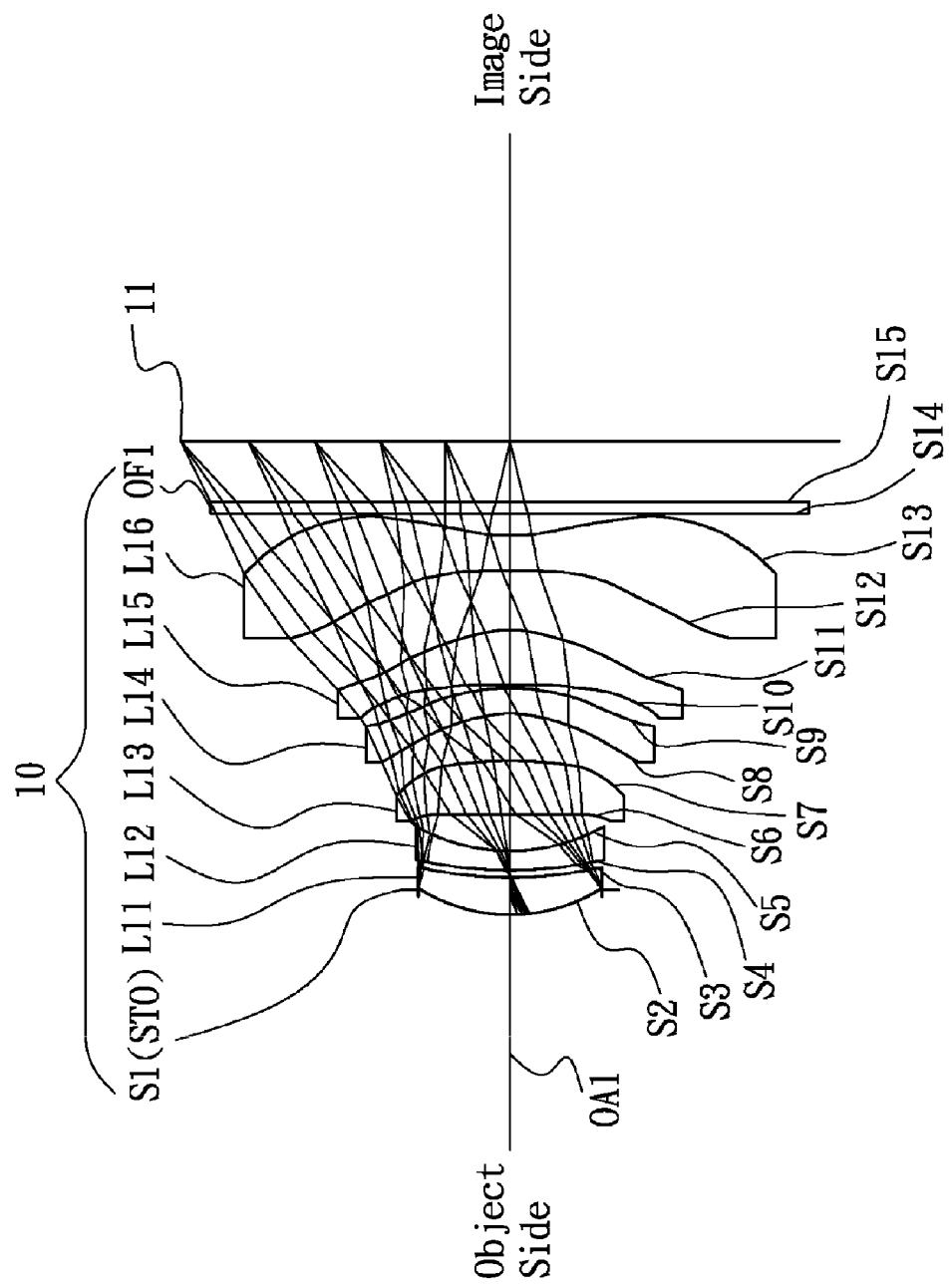
FIG. 1 is a lens layout and optical path diagram of an image capturing lens assembly in accordance with a first embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Detailed structural parameters of the first embodiment of the lens are shown in FIG. 1 and provided in Table 1. Surface radii and axial distances are shown in millimeters (mm). The surfaces are identified according to the corresponding drawing reference, from the object side to the image side as shown. The aspheric surfaces are the surfaces S6, S7, S10, S11, S12 and S13 given in Table 1 and described by the following equation:

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

where:

Z is the surface sag;

c is curvature;

k is conic constant;

h is the vertical distance from the lens surface to the optical axis; and

A, B, C, D, E, F and G are aspheric coefficients. The aspheric coefficients A, B, C, D, E, F and G are given in Table 2.

FIG. 1 is a lens layout and optical path diagram of the image capturing lens assembly in accordance with a first embodiment of the present invention. The image capturing lens assembly 10 includes a stop S1 (STO), a first lens element L11, a second lens element L12, a third lens element L13, a fourth lens element L14, a fifth lens element L15 and an optical filter OF1, all of which are arranged in sequence from an object side to an image side along an optical axis OA1. An image sensor 11 is disposed between the optical filter OF1 and the image side. The first lens element L11 is made of glass material. The first lens element L11 is a meniscus lens with positive refractive power, the convex surface S2 of the first lens element L11 faces the object side of the image capturing lens assembly 10, and the concave surface S3 of the first lens element L11 faces the image side of the image capturing lens assembly 10. The second lens element L12 is made of plastic material. The second lens element L12 is a meniscus lens with negative refractive power, the convex surface S4 of the second lens element L12 faces the object side of the image capturing lens assembly 10, and the concave surface S5 of the second lens element L12 faces the image side of the image capturing lens assembly 10. The third lens element L13 is made of plastic material. The third lens L13 element is a convex-convex lens with positive refractive power, the convex surface S6 of the third lens element L13 faces the object side of the image capturing lens assembly 10, and the convex surface S7 of the third lens element L13 faces the image side of the image capturing lens assembly 10. The convex surface S6 and the convex surface S7 both are aspheric surfaces. The convex surface S6 of said third lens element L13 has at least one inflection point between the optical axis and an edge of said third lens element L13. The fourth lens element L14 is made of plastic material. The fourth lens element L14 is a meniscus lens with negative refractive power, the concave surface S8 of the fourth lens element L14 faces the object side of the image capturing lens assembly 10, and the convex surface S9 of the fourth lens element L14 faces the image side of the image capturing lens assembly 10. The fifth lens element L15 is made of plastic material. The fifth lens element L15 is a meniscus lens with positive refractive power, the concave surface S10 of the fifth lens element L15 faces the object side, and the convex surface S11 of the fifth lens element L15 faces the image side, wherein both of the concave surface S10 and convex surface S11 are aspheric surfaces. The sixth lens element L16 is made of plastic material. The sixth lens element L16 is a concave-concave lens with negative refractive power, the surface S12 of the sixth lens element L16 faces the object side, and the surface S13 of the sixth lens element L16 faces the image side, wherein both of the surface S12 and surface S13 are aspheric surfaces. The concave surface S13 has at least one inflection point between the optical axis and an edge of said sixth lens element L16.

The optical filter OF1 is made of glass material. The surface S14 and surface S15 of the optical filter OF1 both are plane surfaces. The image sensor 11 includes a sensor element (not shown).

The image capturing lens assembly 10 of the first embodiment of the present invention is provided with the optical specifications shown in Table 1, which include the focal length, F-number, Total Axial Length, radius of curvature of each lens surface, thickness of each lens, refractive index of each lens and Abbe number of each lens.

TABLE 1

Focus Length = 4.290 mm, F-number = 2.05
Total Axial Length = 5.433 mm

| Surface number | Radius of Curvature (mm) | Thickness (mm) | Nd | Vd | Focus Length (mm) |
|---|---|---|---|---|---|
| OBJ | Infinity | Infinity | | | |
| S1(STO) | Infinity | −0.304407 | | | |
| S2 | 2.035556 | 0.445063 | 1.666 | 55.066 | 4.899 |
| S3 | 4.906115 | 0.088751 | | | |
| S4 | 3.629075 | 0.219358 | 1.640 | 23.527 | −11.890 |
| S5 | 2.406256 | 0.403993 | | | |
| S6 | 14.355461 | 0.615551 | 1.544 | 56.094 | 7.846 |
| S7 | −6.029564 | 0.535193 | | | |
| S8 | −1.798168 | 0.298438 | 1.640 | 23.527 | −9.497 |
| S9 | −2.709254 | 0.034174 | | | |
| S10 | −21.837734 | 0.622440 | 1.535 | 55.711 | 3.350 |
| S11 | −1.680993 | 0.679152 | | | |
| S12 | −9.874585 | 0.409935 | 1.535 | 55.711 | −3.062 |
| S13 | 2.004740 | 0.23 | | | |
| S14 | Infinity | 0.145 | 1.517 | 64.167 | |
| S15 | Infinity | 0.705637 | | | |

TABLE 2

| Surface number | k<br>D | A<br>E | B<br>F | C<br>G |
|---|---|---|---|---|
| S2 | −0.77963<br>0.000258 | 0.015045<br>0.004086 | 0.011639<br>−0.00067 | −0.00371<br>0 |
| S3 | 5.226127<br>−0.04854 | −0.03827<br>0.048415 | 0.03041<br>−0.01774 | 0.017873<br>0 |
| S4 | 1.556924<br>−0.01649 | −0.10167<br>0.035453 | 0.093473<br>−0.02007 | −0.03026<br>0 |
| S5 | −1.13035<br>0.040416 | −0.03958<br>−0.02105 | 0.065005<br>0.003384 | −0.03746<br>0 |
| S6 | 0.268265<br>0.021341 | −0.02575<br>−0.06264 | −0.05375<br>0.030591 | 0.030347<br>0 |
| S7 | −1.09192<br>0.006557 | −0.03321<br>−0.00526 | −0.03457<br>0.001493 | −0.00246<br>0 |
| S8 | −0.2748<br>−0.03211 | 0.055557<br>0.008007 | −0.10699<br>−0.00134 | 0.090366<br>0 |
| S9 | 0<br>−0.00829 | −0.01<br>−0.00041 | −0.03699<br>0.000227 | 0.038258<br>0 |
| S10 | −14.8217<br>0.000327 | −0.0549<br>−0.0004 | 0.016496<br>9.3E−05 | −0.00305<br>0 |
| S11 | −0.73179<br>−0.00251 | 0.071355<br>0.000254 | −0.03239<br>−1.6E−05 | 0.013139<br>0 |
| S12 | 0<br>−3.3E−05 | −0.06215<br>1.97E−06 | 0.012503<br>6.43E−08 | −0.00058<br>0 |
| S13 | −9.4581<br>9.09E−05 | −0.03722<br>−4.9E−06 | 0.007015<br>1.31E−07 | −0.00102<br>0 |

Figure 11:
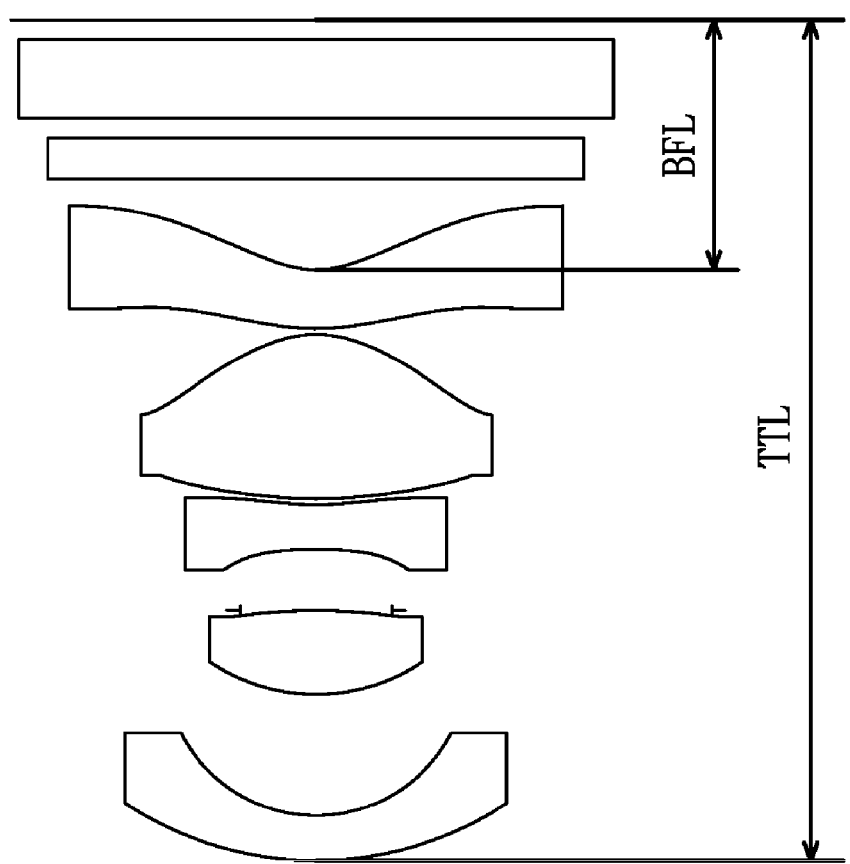
FIG. 11 indicates the distance of TTL and BFL of an image capturing lens assembly of the present invention.

V1 is an Abbe number of said first lens element to d light, N1 is a refractivity of said first lens element to d light, wherein d light is a light with a wavelength of 587.6 nm, TTL is a distance along the optical axis from a surface of said first lens element that faces the object side of the image capturing lens assembly to an image sensor, BFL is a distance along the optical axis from a surface of said sixth lens element that faces the image side of the image capturing lens assembly to the image sensor, are shown in FIG. 11, f is a focal length of said lens assembly, f6 is a focal length of said sixth lens element, f3 is a focal length of the third lens element, and f4 is a focal length of the fourth lens element.

In the image capturing lens assembly 10, the focal length f=4.290 mm, BFL=1.081 mm, TTL=5.433 mm, $f_3$=7.846 mm, $f_4$=−9.497 mm, $f_6$=−3.062 mm, V1=55.066, and N1=1.666, which can be seen in Table 1. As for BFL, 0.23+0.145+0.705637=1.081. The calculated values of various conditions fully satisfy the following requirements:

$20 < V1/N1 < 35$ (1)

$0.15 < BFL/TTL \leq 0.218$ (2)

$-2 < f/f6 \leq -0.991$ (3)

$-0.967 \leq f3/f4 < -0.5$ (4)

Figure 2B:
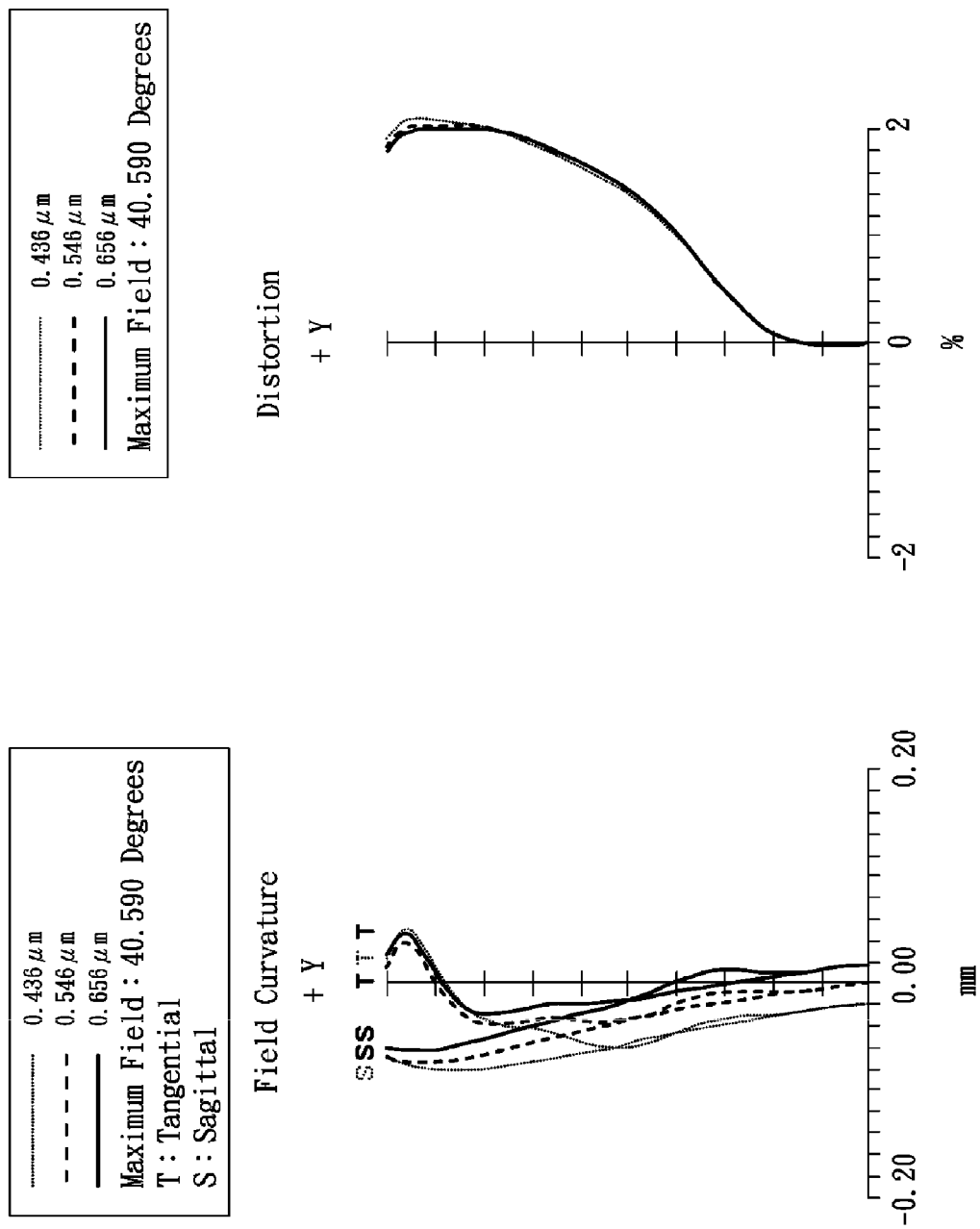
FIG. 2B is an astigmatic field curves diagram and a distortion diagram of an image capturing lens assembly in accordance with the first embodiment of the present invention.

By the above arrangements of the lenses and stop STO, the image capturing lens assembly 10 can meet the requirements of optical performance as seen in FIGS. 2A and 2B, wherein FIG. 2A shows the longitudinal spherical aberration of the image capturing lens assembly 10 of the present embodiment, FIG. 2B shows the astigmatic field curves of the image capturing lens assembly 10, and FIG. 2B also shows the distortion of the image capturing lens assembly 10.

It can be seen from FIG. 2A that the longitudinal spherical aberration in the present embodiment ranges between −0.1 mm to 0.1 mm for the wavelength range between 0.436 μm to 0.656 μm. It can be seen from FIG. 2B that the astigmatic field curves of tangential direction and sagittal direction in the present embodiment ranges between −0.1 mm to 0.1 mm. It can be also seen from FIG. 2B that the distortion in the present embodiment does not exceed ±2%. It is clear that the longitudinal spherical aberration, the astigmatic field curves and the distortion of the image capturing lens assembly 10 of the present embodiment can be corrected effectively and results in better optical performance.

If the value of V1/N1 is greater than 35, the refractive power of the first lens will become less than 1.666, and it will become difficult to shorten the total length of the imaging lens. If the value of V1/N1 is less than 20, the refractive power of the first lens will become greater than 1.666, and it will become difficult to shorten the total length of the imaging lens.

Figure 3:
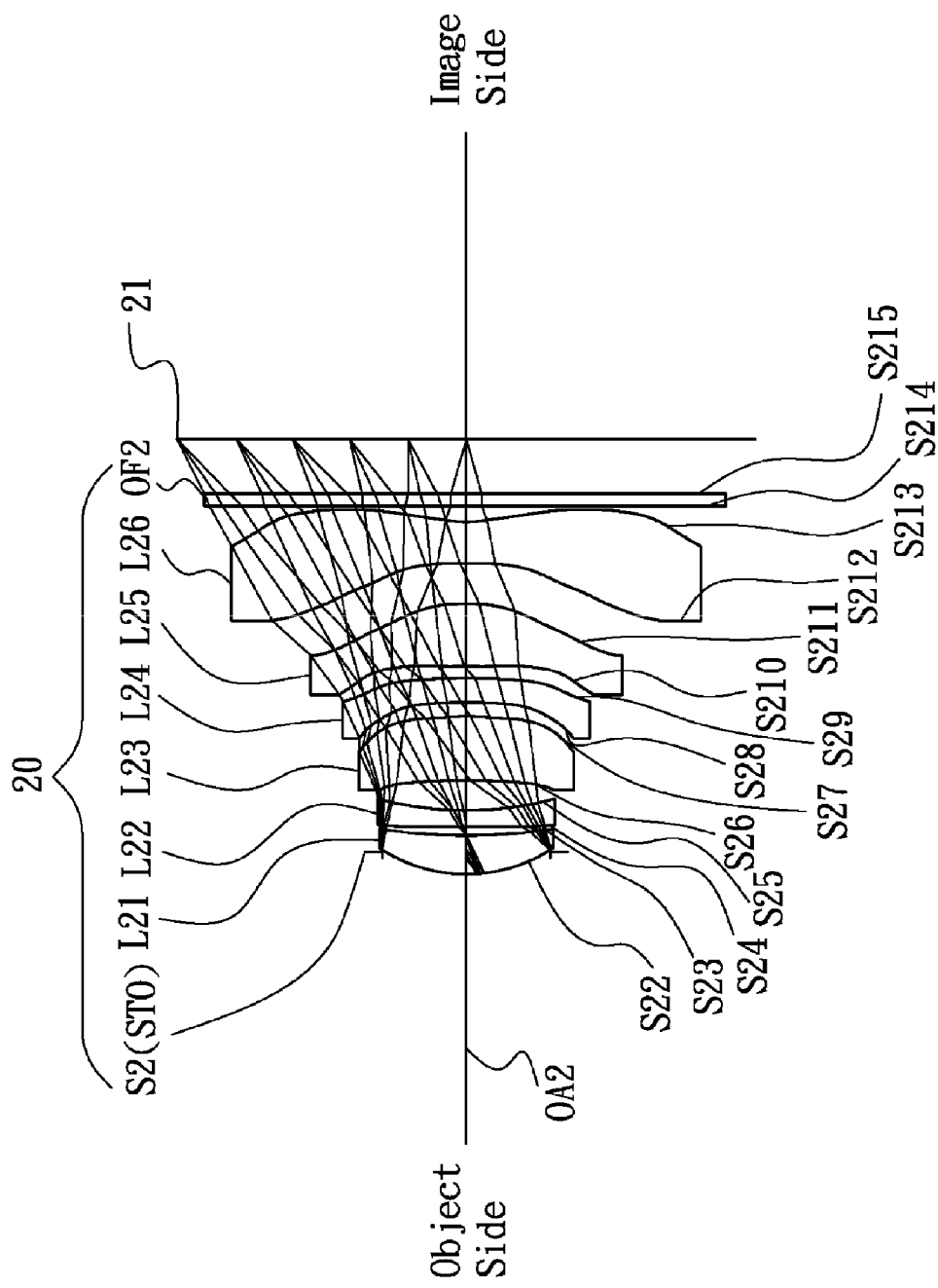
FIG. 3 is a lens layout and optical path diagram of an image capturing lens assembly in accordance with a second embodiment of the present invention.

Detailed structural parameters of the second embodiment of the lens are shown in FIG. 3 and provided in Table 3. Surface radii and axial distances are shown in millimeters (mm). The surfaces are identified according to the corresponding drawing reference, from the object side to the image side as shown. The aspheric surfaces are the surfaces S6, S7, S10, S11, S12 and S13 given in Table 3 and described by the following equation:

$$z = \frac{ch^2}{1+[1-(k+1)c^2h^2]^{1/2}} + Ah^4 + Bh^6 + Ch^8 + Dh^{10} + Eh^{12} + Fh^{14} + Gh^{16}$$

Where:
Z is the surface sag;
c is curvature of each lens;
k is conic constant;
h is the vertical distance from the lens surface to the optical axis; and
A, B, C, D, E, F and G are aspheric coefficients. The aspheric coefficients A, B, C, D, E, F and G are given in Table 4.

FIG. 3 is a lens layout and optical path diagram of the image capturing lens assembly in accordance with a second embodiment of the present invention. The image capturing lens assembly 20 includes a stop S2 (STO), a first lens L21, a second lens L22, a third lens L23, a fourth lens L24, a fifth lens L25 and an optical filter OF2, all of which are arranged in sequence from an object side to an image side along an optical axis OA2. An image sensor 21 is disposed between the optical filter OF2 and the image side. The first lens L21 is made of glass material. The first lens L21 is a meniscus lens with positive refractive power, the convex surface S22 of the first lens L21 faces the object side of the image capturing lens assembly 20, and the concave surface S23 of the first lens L21 faces the image side of the image capturing lens assembly 20. The second lens L22 is made of plastic material. The second lens L22 is a meniscus lens with negative refractive power, the convex surface S24 of the second lens L22 faces the object side of the image capturing lens assembly 20, and the concave surface S25 of the second lens L22 faces the image side of the image capturing lens assembly 20. The third lens L23 is made of plastic material. The third lens L23 is a meniscus lens with positive refractive power, the concave surface S26 of the third lens L23 faces the object side of the image capturing lens assembly 20, and the convex surface S27 of the third lens L23 faces the image side of the image capturing lens assembly 20. The concave surface S26 and the convex surface S27 both are aspheric surfaces. The fourth lens L24 is made of plastic material. The fourth lens L24 is a meniscus lens with negative refractive power, the concave surface S28 of the fourth lens L24 faces the object side of the image capturing lens assembly 20, and the convex surface S29 of the fourth lens L24 faces the image side of the image capturing lens assembly 20. The fifth lens L25 is made of plastic material. The fifth lens L25 is a meniscus lens with positive refractive power, the surface S210 of the fifth lens L25 faces the object side, and the surface S211 of the fifth lens L25 faces the image side, wherein both of the surface S210 and surface S211 are aspheric surfaces. The sixth lens L26 is made of plastic material. The sixth lens L26 is a concave-concave lens with negative refractive power, the surface S212 of the sixth lens L26 faces the object side, and the surface S213 of the sixth lens L26 faces the image side, wherein both of the surface S212 and surface S213 are aspheric surfaces. The concave surface S213 has at least one inflection point between the optical axis and an edge of said sixth lens element L26.

The optical filter OF2 is made of glass material. The surface S214 and surface S215 of the optical filter OF2 both are plane surfaces. The image sensor 21 includes a sensor element (not shown).

The image capturing lens assembly 20 of the second embodiment of the present invention is provided with the optical specifications shown in Table 3, which include the focal length, F-number, Total Axial Length, surface number, radius of curvature of each lens surface, thickness of each lens, refractive index of each lens and Abbe number of each lens.

TABLE 3

Focus Length = 4.488 mm, F-number = 2.04
Total Axial Length = 5.680 mm

| Surface number | Radius of Curvature (mm) | Thickness (mm) | Nd | Vd | Focus Length (mm) |
|---|---|---|---|---|---|
| OBJ | Infinity | Infinity | | | |
| S1(STO) | Infinity | −0.310658 | | | |
| S2 | 2.141276 | 0.517963 | 1.666 | 55.066 | 4.026 |
| S3 | 9.453879 | 0.082276 | | | |
| S4 | 9.635950 | 0.219644 | 1.640 | 23.527 | −11.214 |
| S5 | 4.098793 | 0.386119 | | | |
| S6 | −104.008867 | 0.846604 | 1.544 | 56.094 | 12.056 |
| S7 | −6.219849 | 0.210050 | | | |
| S8 | −3.933085 | 0.299798 | 1.640 | 23.527 | −12.463 |
| S9 | −7.918380 | 0.174335 | | | |
| S10 | −20.026908 | 0.781276 | 1.535 | 55.711 | 3.435 |
| S11 | −1.714473 | 0.552967 | | | |
| S12 | −3.493090 | 0.534878 | 1.535 | 55.711 | −2.784 |
| S13 | 2.761380 | 0.2 | | | |
| S14 | Infinity | 0.145 | 1.517 | 64.167 | |
| S15 | Infinity | 0.729133 | | | |

TABLE 4

| Surface number | k<br>D | A<br>E | B<br>F | C<br>G |
|---|---|---|---|---|
| S2 | −0.88533<br>−0.00015 | 0.013661<br>0.002641 | 0.006513<br>−0.0012 | −0.00261<br>0 |
| S3 | 12.97105<br>−0.05161 | −0.03308<br>0.039746 | 0.019936<br>−0.01227 | 0.024113<br>0 |
| S4 | 31.42672<br>−0.0234 | −0.09237<br>0.040717 | 0.105661<br>−0.0154 | −0.04578<br>0 |
| S5 | −2.99452<br>0.032998 | −0.05007<br>−0.01632 | 0.077926<br>0.007215 | −0.05807<br>0 |
| S6 | −2244.44<br>0.031592 | −0.03609<br>−0.05974 | −0.04357<br>0.025855 | 0.021462<br>0 |
| S7 | −52.776<br>0.005959 | −0.05057<br>−0.00413 | −0.04078<br>0.000812 | 0.005783<br>0 |
| S8 | 6.85058<br>−0.03084 | 0.03421<br>0.008827 | −0.10758<br>−0.00132 | 0.075422<br>0 |
| S9 | 0<br>−0.00896 | −0.00608<br>−0.00014 | −0.05152<br>0.00038 | 0.035071<br>0 |
| S10 | 78.61808<br>0.000121 | −0.04853<br>−0.00074 | 0.003439<br>0.000234 | −7.9E−06<br>0 |
| S11 | −0.68733<br>−0.00278 | 0.04488<br>0.00032 | −0.01698<br>−1.6E−05 | 0.011015<br>0 |
| S12 | 0<br>−2.3E−05 | −0.02691<br>2.1E−06 | 0.009054<br>2.75E−08 | −0.00051<br>0 |
| S13 | −11.5165<br>0.000119 | −0.03092<br>−7.1E−0 | 0.006713<br>61.9E−07 | −0.00116<br>0 |

In the image capturing lens assembly 20, the focal length f=4.488 mm, BFL=1.074 mm, TTL=5.680 mm, $f_3$=12.056 mm, $f_4$=−12.463 mm, $f_6$=−2.784 mm, V1=55.066, and N1=1.666, which can be seen in table 3. As for BFL, 0.2+0.145+0.729133=1.074. The calculated values of various conditions fully satisfy the following requirements:

$$20 < V1/N1 < 35 \quad (1)$$

$$0.15 < BFL/TTL \leq 0.218 \quad (2)$$

$$-2 < f/f_6 \leq -0.991 \quad (3)$$

$$-0.967 \leq f_3/f_4 < -0.5 \quad (4)$$

Figure 4A:
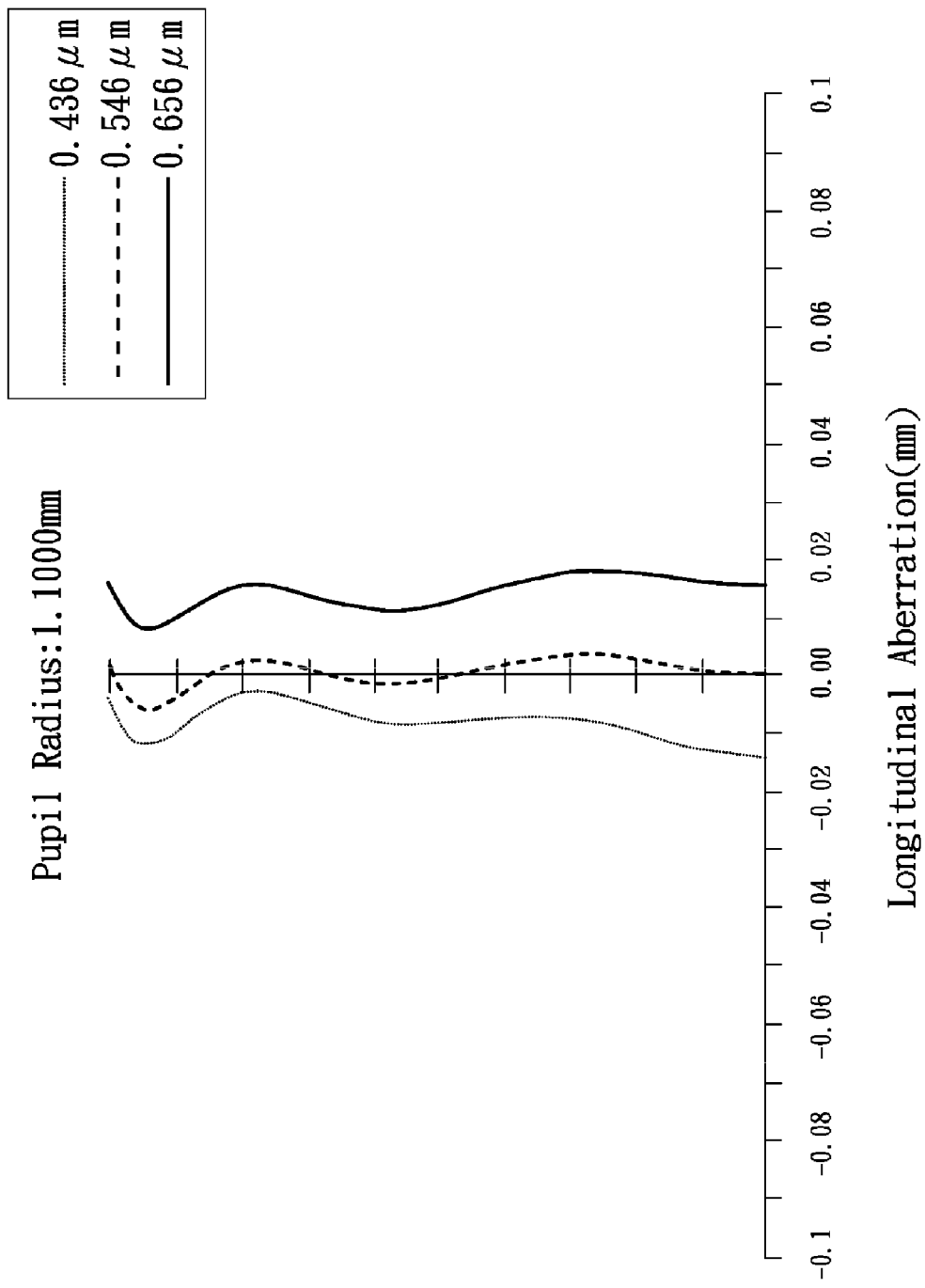
FIG. 4A is a longitudinal spherical aberration diagram of an image capturing lens assembly in accordance with the second embodiment of the present invention.
Figure 4B:
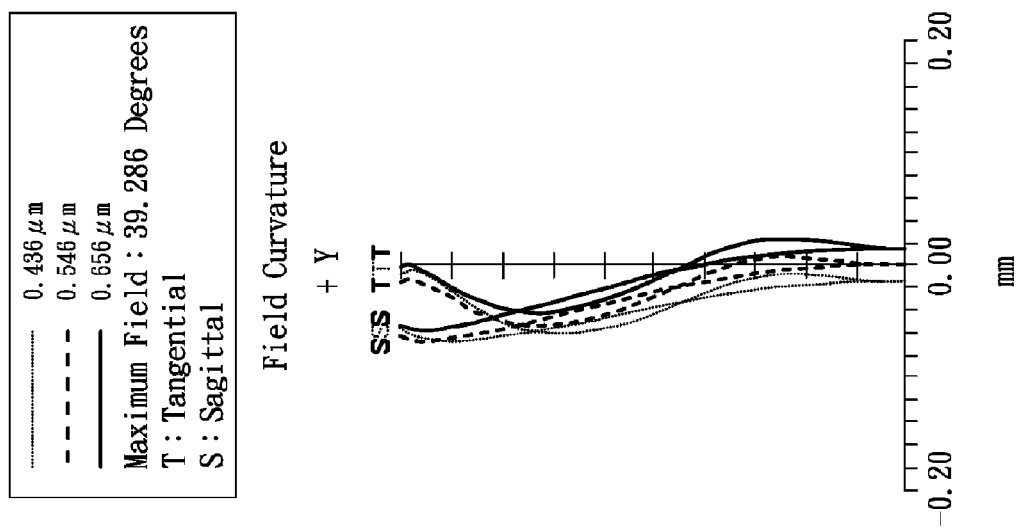
FIG. 4B is an astigmatic field curves diagram and a distortion diagram of an image capturing lens assembly in accordance with the second embodiment of the present invention.
Figure 4B:
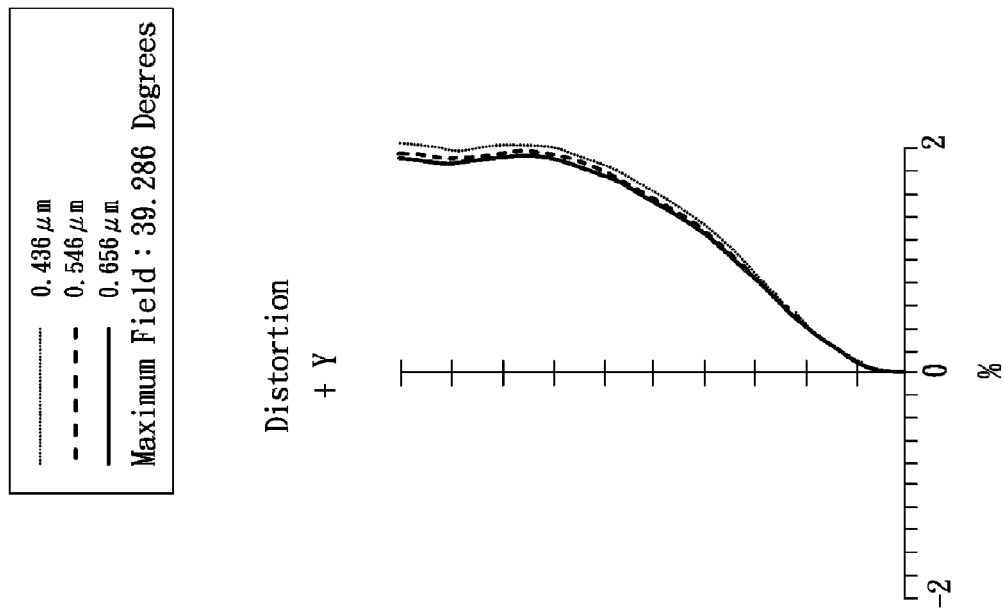

By the above arrangements of the lenses and stop STO, the image capturing lens assembly 20 of the present embodiment can meet the requirements of optical performance as seen in FIGS. 4A and 4B, wherein FIG. 4A shows the longitudinal spherical aberration of the image capturing lens assembly 10 of the present embodiment, FIG. 4B shows the astigmatic field curves of the image capturing lens assembly 10 of the present embodiment and FIG. 4B also shows the distortion of the image capturing lens assembly 10 of the present embodiment. If the value of V1/N1 is greater than 35, the refractive power of the first lens will become less than 1.666, and it will become difficult to shorten the total length of the imaging lens. If the value of V1/N1 is less than 20, the refractive power of the first lens will become greater than 1.666, and it will become difficult to shorten the total length of the imaging lens.

It can be seen from FIG. 4A that the longitudinal spherical aberration in the present embodiment ranges between −0.1 mm to 0.1 mm for the wavelength range between 0.436 µm to 0.656 µm. It can be seen from FIG. 4B that the astigmatic field curves of tangential direction and sagittal direction in the present embodiment ranges between −0.1 mm to 0.1 mm. It can be also seen from FIG. 4B that the distortion in the present embodiment does not exceed ±2%. It is clear that the longitudinal spherical aberration, the astigmatic field curves and the distortion of the image capturing lens assembly 10 of the present embodiment can be corrected effectively and results in better optical performance.

Figure 5:
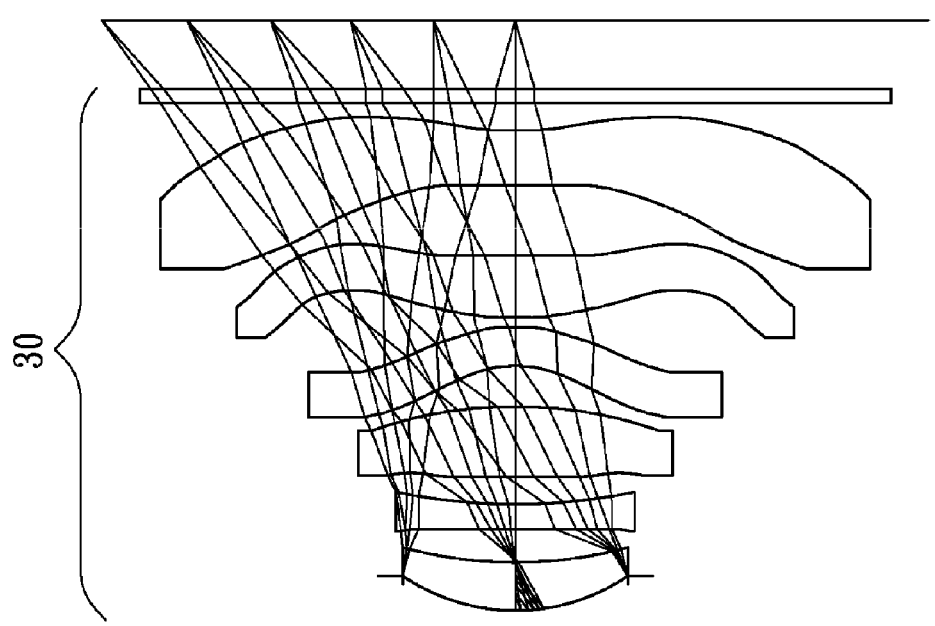
FIG. 5 is a lens layout and optical path diagram of an image capturing lens assembly in accordance with the second embodiment of the present invention.

Referring to FIG. 5, FIG. 6, table 5 and table 6 are a third embodiment of the present invention. In this embodiment, the focal length f=4.262 mm, BFL=1.033 mm, TTL=5.431 mm, $f_3$=5.106 mm, $f_4$=−6.511 mm, $f_6$=−4.299 mm, V1=57.333, and N1=1.658, which can be seen in Table 5. As for BFL, 0.25+0.145+0.638283=1.033. The calculated values of various conditions fully satisfy the following requirements:

$$20 < V1/N1 < 35 \quad (1)$$

$$0.15 < BFL/TTL \leq 0.218 \quad (2)$$

$$-2 < f/f_6 \leq -0.991 \quad (3)$$

$$-0.967 \leq f_3/f_4 < -0.5 \quad (4)$$

Figure 6A:
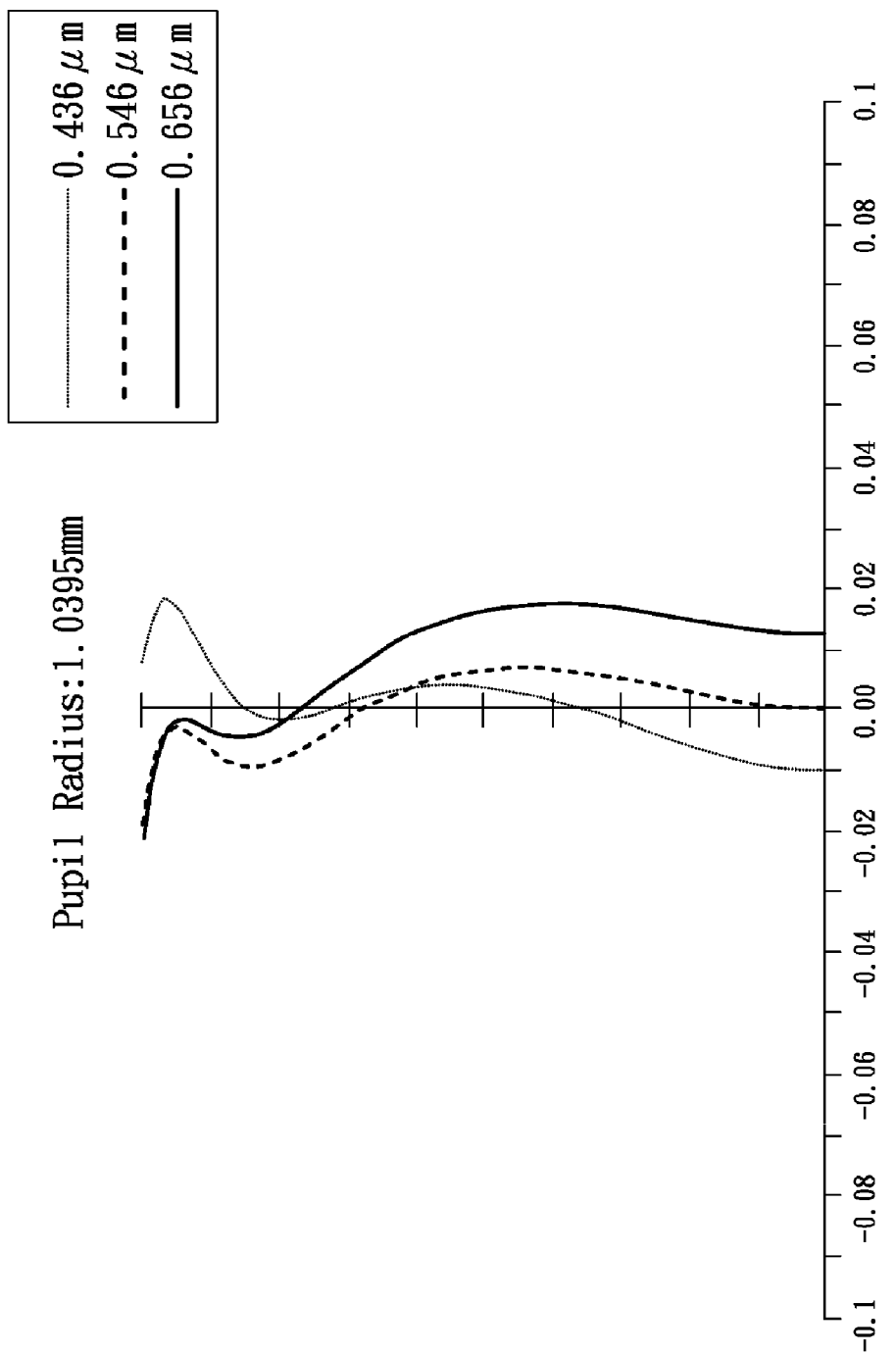
FIG. 6A is a longitudinal spherical aberration diagram of an image capturing lens assembly in accordance with the second embodiment of the present invention.
Figure 6B:
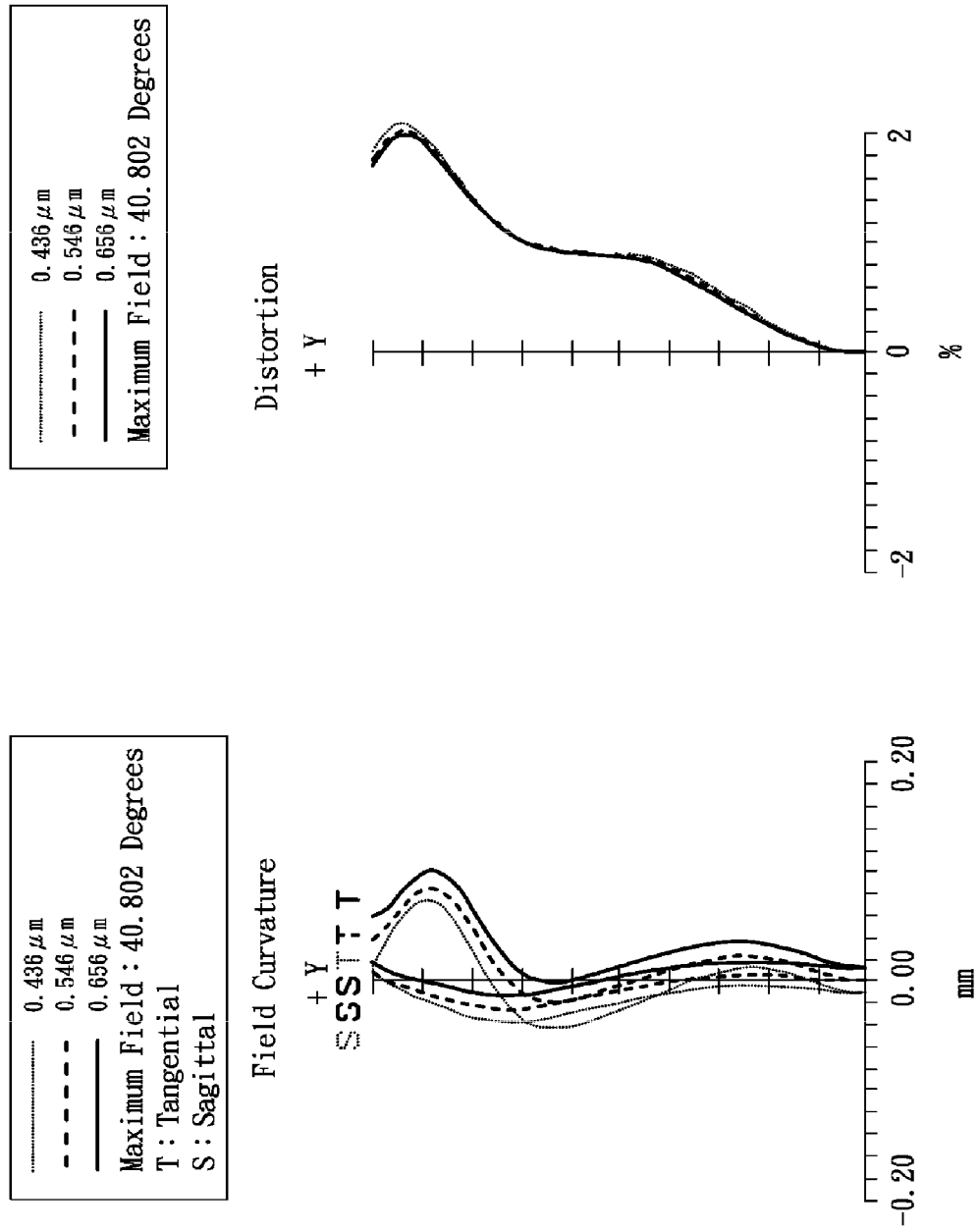
FIG. 6B is an astigmatic field curves diagram and a distortion diagram of an image capturing lens assembly in accordance with the second embodiment of the present invention.

By the above arrangements of the lenses and stop STO, the image capturing lens assembly 30 of the present embodiment can meet the requirements of optical performance as seen in FIGS. 6A and 6B. The description of the third embodiment is similar to the description of the first and second embodiment, and is not repeated here. The image capturing lens assembly 30 has six lenses. In an embodiment, a seventh lens element can be added between the sixth lens element and the image side.

TABLE 5

Focus Length = 4.262 mm, F-number = 2.04
Total Axial Length = 5.431 mm

| Surface number | Radius of Curvature (mm) | Thickness (mm) | Nd | Vd | Focus Length (mm) |
|---|---|---|---|---|---|
| OBJ | Infinity | Infinity | | | |
| S1(STO) | Infinity | −0.316141 | | | |
| S2 | 1.915520 | 0.457334 | 1.658 | 57.333 | 5.246 |
| S3 | 3.872415 | 0.310759 | | | |
| S4 | 6.148997 | 0.214675 | 1.640 | 23.527 | −12.312 |
| S5 | 3.420655 | 0.249747 | | | |
| S6 | 8.468975 | 0.635668 | 1.544 | 56.094 | 5.106 |
| S7 | −4.057522 | 0.372826 | | | |
| S8 | −0.987937 | 0.366003 | 1.640 | 23.527 | −6.511 |
| S9 | −1.478943 | 0.079935 | | | |
| S10 | 2.351900 | 0.576456 | 1.535 | 55.711 | 4.560 |
| S11 | 52.433536 | 0.646401 | | | |
| S12 | −56.592211 | 0.488234 | 1.535 | 55.711 | −4.299 |
| S13 | 2.417712 | 0.25 | | | |

TABLE 5-continued

Focus Length = 4.262 mm, F-number = 2.04
Total Axial Length = 5.431 mm

| Surface number | Radius of Curvature (mm) | Thickness (mm) | Nd | Vd | Focus Length (mm) |
|---|---|---|---|---|---|
| S14 | Infinity | 0.145 | 1.517 | 64.167 | |
| S15 | Infinity | 0.638283 | | | |

TABLE 6

| Surface number | k D | A E | B F | C G |
|---|---|---|---|---|
| S2 | -0.6898 | 0.015972 | 0.008764 | -0.00051 |
| | 0.001565 | 0.001915 | -0.00286 | 0 |
| S3 | 1.794042 | -0.0261 | 0.006236 | 0.016396 |
| | -0.04751 | 0.040703 | -0.0169 | 0 |
| S4 | -59.4441 | -0.12713 | 0.059558 | 0.017351 |
| | -0.04555 | 0.015875 | -0.0004 | 0 |
| S5 | -14.636 | -0.08857 | 0.064709 | -0.00422 |
| | 0.03996 | -0.06167 | 0.027112 | 0 |
| S6 | 0 | -0.01321 | -0.0333 | 0.016009 |
| | 0.017941 | -0.02798 | 0.010209 | 0 |
| S7 | -4.15704 | 0.016763 | -0.01187 | -0.01002 |
| | 0.008227 | -0.00394 | 0.001412 | 0 |
| S8 | -2.35523 | 0.123794 | -0.12571 | 0.093039 |
| | -0.03497 | 0.007437 | -0.00081 | 0 |
| S9 | -3.60075 | 0.020482 | -0.04724 | 0.037527 |
| | -0.00703 | -0.00049 | 0.000164 | 0 |
| S10 | -0.47867 | -0.04419 | 0.001175 | -0.00354 |
| | 0.001381 | -0.00027 | 2.2E-05 | 0 |
| S11 | 0 | 0.088018 | -0.05608 | 0.015124 |
| | -0.00246 | 0.000216 | -7.4E-06 | 0 |
| S12 | 0 | -0.06576 | 0.011729 | -0.0006 |
| | -2.1E-05 | 3.46E-06 | -1.2E-07 | 0 |
| S13 | -11.1135 | -0.04076 | 0.006544 | -0.00074 |
| | 7.7E-05 | -6.5E-06 | 2.39E-07 | 0 |

Figure 7:
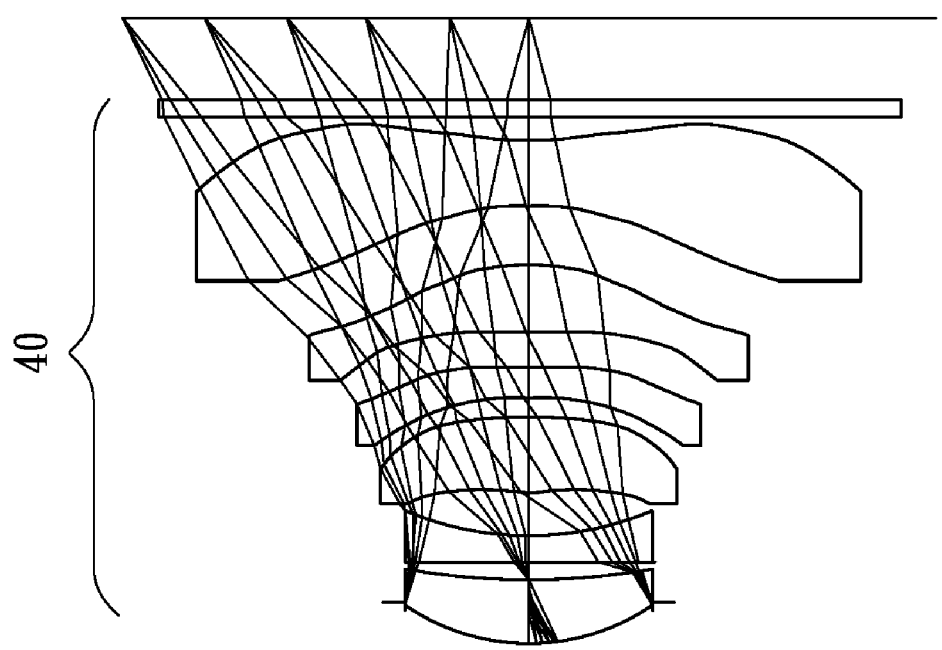
FIG. 7 is a lens layout and optical path diagram of an image capturing lens assembly in accordance with the second embodiment of the present invention.

FIG. 7, FIG. 8, Table 7 and Table 8 illustrate a fourth embodiment of the present invention. In the image capturing lens assembly 40, the focal length f=4.276 mm, BFL=1.039 mm, TTL=5.281 mm, $f_3$=9.022 mm, $f_4$=-10.572 mm, $f_6$=-2.417 mm, V1=55.066, and N1=1.666, which can be seen in Table 7. As for BFL, 0.213869+0.145+0.680262=1.039. The calculated values of various conditions fully satisfy the following requirements:

$$20 < V1/N1 < 35 \quad (1)$$

$$0.15 < BFL/TTL \leq 0.218 \quad (2)$$

$$-2 < f/f_6 \leq 0.991 \quad (3)$$

$$-0.967 \leq f_3/f_4 < -0.5 \quad (4)$$

Figure 8A:
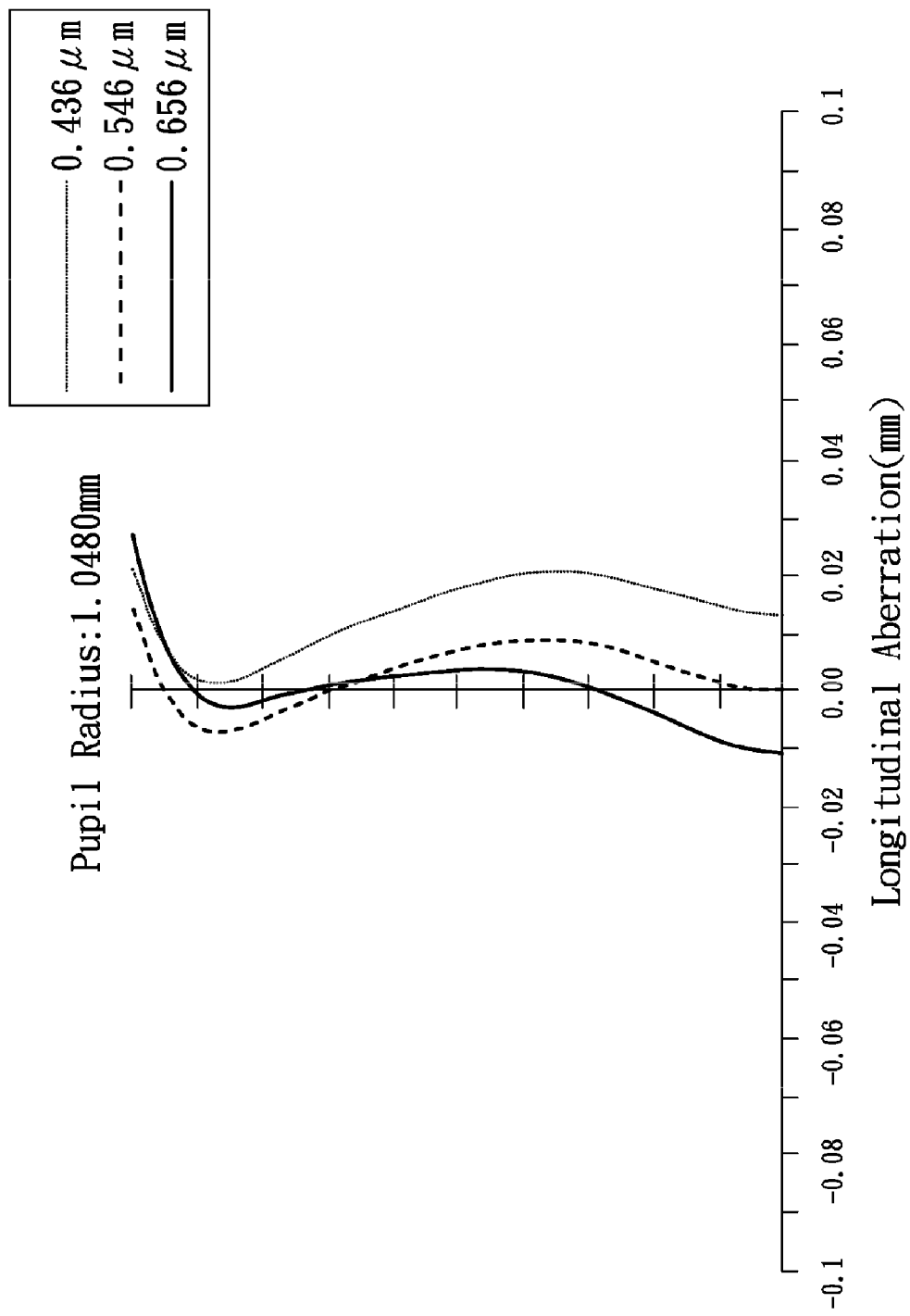
FIG. 8A is a longitudinal spherical aberration diagram of an image capturing lens assembly in accordance with the second embodiment of the present invention.
Figure 8B:
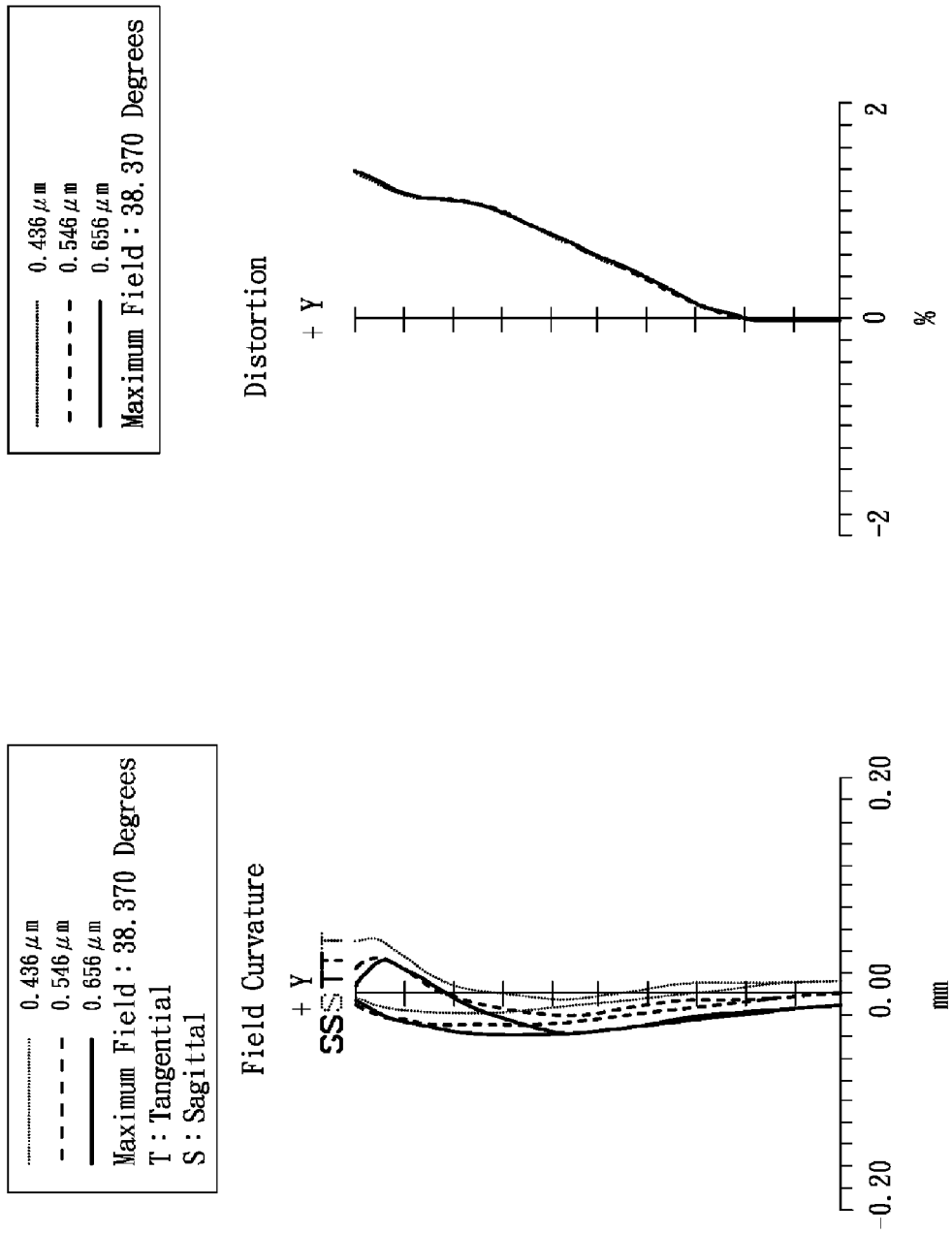
FIG. 8B is an astigmatic field curves diagram and a distortion diagram of an image capturing lens assembly in accordance with the second embodiment of the present invention.

By the above arrangements of the lenses and stop STO, the image capturing lens assembly 40 of the present embodiment can meet the requirements of optical performance as seen in FIGS. 8A and 8B. The description of the fourth embodiment is similar to the description of the first and second embodiment, so omitting the description of the fourth embodiment. The image capturing lens assembly 40 has six lenses. In an embodiment, a seventh lens element can be added between the sixth lens element and the image side.

TABLE 7

Focus Length = 4.276 mm, F-number = 2.04
Total Axial Length = 5.28069 mm

| Surface number | Radius of Curvature (mm) | Thickness (mm) | Nd | Vd | Focus Length (mm) |
|---|---|---|---|---|---|
| OBJ | Infinity | Infinity | | | |
| S1(STO) | Infinity | -0.332120 | | | |
| S2 | 1.905528 | 0.540911 | 1.666 | 55.066 | 3.962 |
| S3 | 6.016700 | 0.136277 | | | |
| S4 | 7.152222 | 0.24 | 1.640 | 23.527 | -8.924 |
| S5 | 3.150216 | 0.362078 | | | |
| S6 | 30.000000 | 0.621125 | 1.535 | 55.711 | 9.022 |
| S7 | -5.740368 | 0.176538 | | | |
| S8 | -3.074355 | 0.273590 | 1.640 | 23.527 | -10.572 |
| S9 | -5.785661 | 0.280502 | | | |
| S10 | -35.501860 | 0.583695 | 1.535 | 55.711 | 2.927 |
| S11 | -1.514786 | 0.484362 | | | |
| S12 | -2.877702 | 0.542479 | 1.535 | 55.711 | -2.417 |
| S13 | 2.522926 | 0.213869 | | | |
| S14 | Infinity | 0.145 | 1.517 | 64.167 | |
| S15 | Infinity | 0.680262 | | | |

TABLE 8

| Surface number | k D | A E | B F | C G |
|---|---|---|---|---|
| S2 | -0.81688 | 0.017935 | 0.013283 | -0.00286 |
| | -0.0003 | 0.004457 | -0.00104 | 0 |
| S3 | 5.263002 | -0.04665 | 0.030028 | 0.036002 |
| | -0.09565 | 0.094791 | -0.0367 | 0 |
| S4 | -22.9882 | -0.13254 | 0.157434 | -0.06024 |
| | -0.04892 | 0.081115 | -0.03988 | 0 |
| S5 | -10.5294 | -0.05257 | 0.129335 | -0.08867 |
| | 0.064475 | -0.03896 | 0.015469 | 0 |
| S6 | 6.324669 | -0.05627 | -0.06234 | 0.033089 |
| | 0.048355 | -0.1326 | 0.072517 | 0 |
| S7 | -90.0001 | -0.0632 | -0.08129 | 0.014747 |
| | 0.012894 | -0.01101 | 0.003732 | 0 |
| S8 | 3.608043 | 0.039541 | -0.16214 | 0.135774 |
| | -0.05518 | 0.021801 | -0.00487 | 0 |
| S9 | 0 | -0.03738 | -0.0605 | 0.060356 |
| | -0.01733 | -0.00052 | 0.000928 | 0 |
| S10 | -1.0241 | -0.056 | 0.000435 | 0.000586 |
| | 0.000761 | -0.00165 | 0.000467 | 0 |
| S11 | -0.72238 | 0.069092 | -0.02638 | 0.018292 |
| | -0.00531 | 0.000701 | -3.9E-05 | 0 |
| S12 | 0 | -0.02191 | 0.013075 | -0.001 |
| | -4.7E-05 | 6.47E-06 | 1.55E-07 | 0 |
| S13 | 15.1597 | -0.03625 | 0.008696 | -0.00177 |
| | 0.000216 | -1.6E-05 | 5.53E-07 | 0 |

Figure 9:
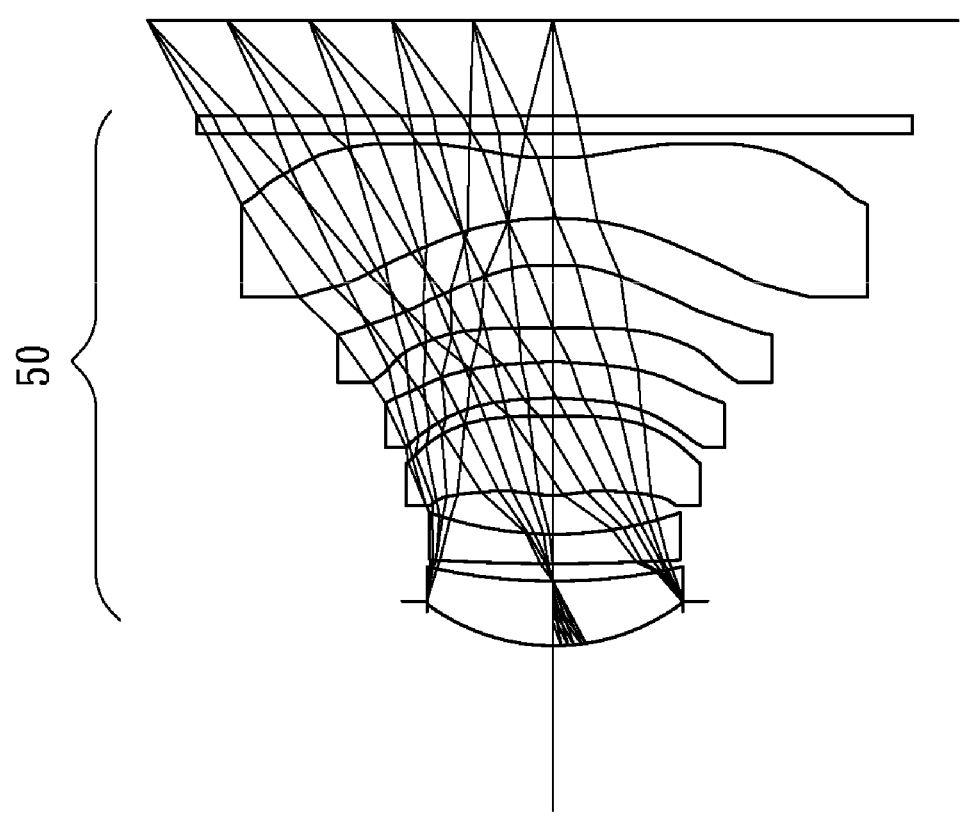
FIG. 9 is a lens layout and optical path diagram of an image capturing lens assembly in accordance with the second embodiment of the present invention.

FIG. 9, FIG. 10, Table 9 and Table 10 illustrate a fifth embodiment of the present invention. In the image capturing lens assembly 50, the focal length f=4.394 mm, BFL=1.149 mm, TTL=5.280 mm, $f_3$=8.137 mm, $f_4$=-10.673 mm, $f_6$=-2.410 mm, V1=55.418, and N1=1.669, which can be seen in Table 9. As for BFL, 0.198183+0.145+0.805775=1.149. The calculated values of various conditions fully satisfy the following requirements:

$$20 < V1/N1 < 35 \quad (1)$$

$$0.15 < BFL/TTL \leq 0.218 \quad (2)$$

$$-2 < f/f_6 \leq -0.991 \quad (3)$$

$$-0.967 \leq f_3/f_4 < -0.5 \quad (4)$$

Figure 10B:
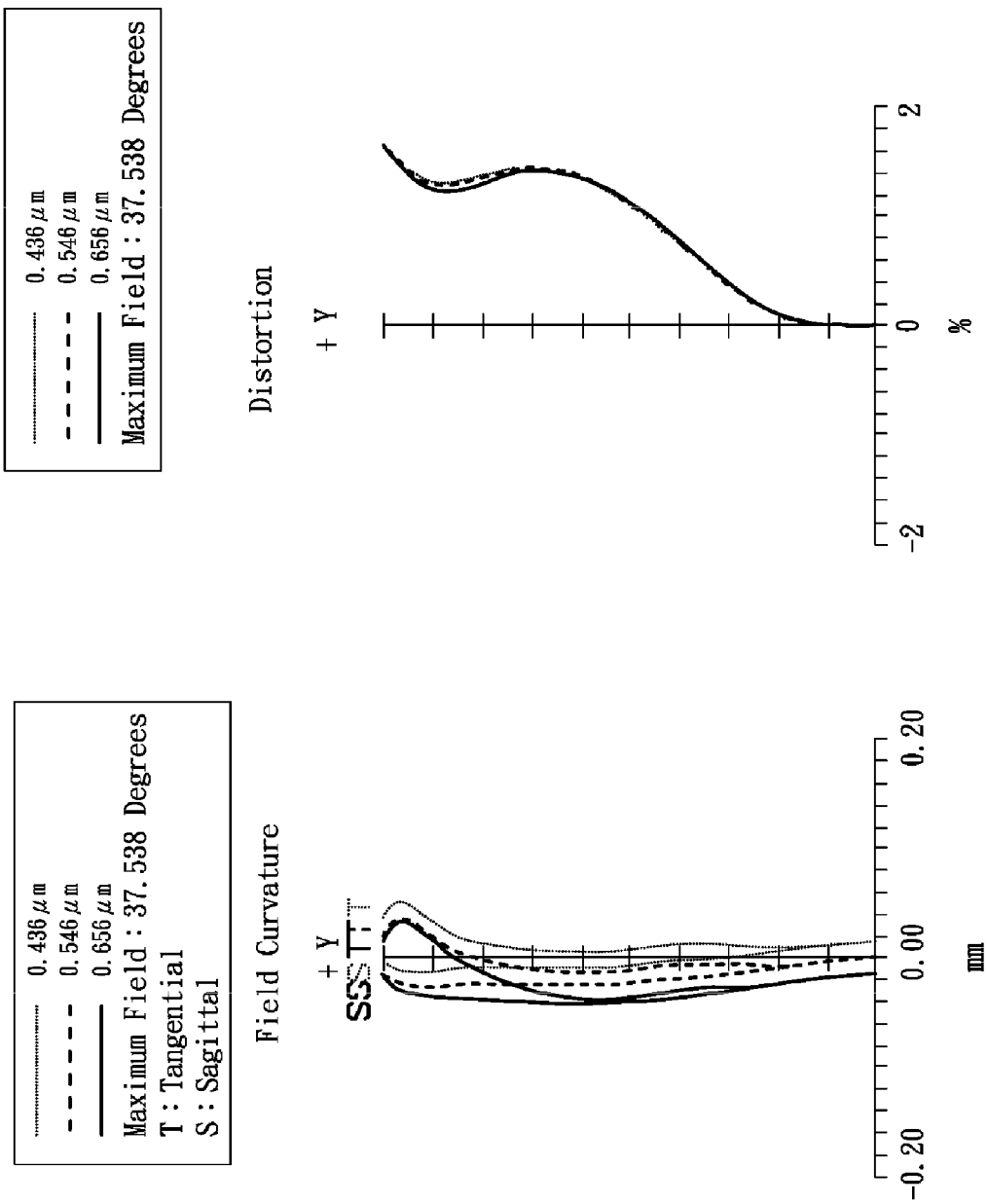
FIG. 10B is an astigmatic field curves diagram and a distortion diagram of an image capturing lens assembly in accordance with the second embodiment of the present invention.

By the above arrangements of the lenses and stop STO, the image capturing lens assembly 50 of the present embodiment can meet the requirements of optical performance as seen in FIGS. 10A and 10B. The description of the fifth embodiment is similar to the description of the first and second embodiment, so omitting the description of the fifth embodiment. The image capturing lens assembly 50 has six lenses. In an embodiment, a seventh lens element can be added between the sixth lens element and the image side.

TABLE 9

Focus Length = 4.394 mm, F-number = 2.04
Total Axial Length = 5.28000 mm

| Surface number | Radius of Curvature (mm) | Thickness (mm) | Nd | Vd | Focus Length (mm) |
|---|---|---|---|---|---|
| OBJ | Infinity | Infinity | | | |
| S1(STO) | Infinity | −0.361414 | | | |
| S2 | 1.845761 | 0.547447 | 1.669 | 55.418 | 4.280 |
| S3 | 4.539083 | 0.136004 | | | |
| S4 | 6.773884 | 0.27 | 1.643 | 22.465 | −11.467 |
| S5 | 3.490992 | 0.326584 | | | |
| S6 | 13.375805 | 0.653316 | 1.535 | 55.711 | 8.137 |
| S7 | −6.384412 | 0.158100 | | | |
| S8 | −2.927268 | 0.295646 | 1.643 | 22.465 | −10.673 |
| S9 | −5.270166 | 0.294125 | | | |
| S10 | −34.740008 | 0.538441 | 1.535 | 55.711 | 3.003 |
| S11 | −1.550474 | 0.394455 | | | |
| S12 | −2.712102 | 0.516925 | 1.535 | 55.711 | −2.410 |
| S13 | 2.642322 | 0.198183 | | | |
| S14 | Infinity | 0.145 | 1.517 | 64.167 | |
| S15 | Infinity | 0.805775 | | | |

TABLE 10

| Surface number | k D | A E | B F | C G |
|---|---|---|---|---|
| S2 | −0.85262 −0.00078 | 0.01775 0.00447 | 0.01309 −0.001 | −0.0033 0 |
| S3 | −0.01054 −0.1031 | −0.0541 0.10606 | 0.03217 −0.03949 | 0.03593 0 |
| S4 | −17.0554 −0.0499 | −0.13872 0.09482 | 0.1594 −0.04441 | −0.06359 0 |
| S5 | −13.7146 0.06907 | −0.06149 −0.04623 | 0.1331 0.02061 | −0.09271 0 |
| S6 | −89.9062 0.05389 | −0.06652 −0.14574 | −0.05056 0.07951 | 0.02858 0 |
| S7 | −90 0.01602 | −0.05799 −0.01182 | −0.0952 0.00338 | 0.01926 0 |
| S8 | 3.98719 −0.06148 | 0.05335 0.02403 | −0.1687 −0.00467 | 0.14273 0 |
| S9 | 0 −0.01917 | −0.029 −0.00042 | −0.06586 0.00111 | 0.06264 0 |
| S10 | −1.0241 0.00054 | −0.06409 −0.00202 | −0.00445 0.00074 | −1E−04 0 |
| S11 | −0.69648 −0.0058 | 0.0749 0.00081 | −0.02851 −4.7E−05 | 0.01907 0 |
| S12 | 0 −5.4E−05 | −0.02202 4.9E−06 | 0.01379 4.3E−07 | −0.00097 0 |
| S13 | −17.1998 0.00024 | −0.03855 −1.9E−05 | 0.00871 7.4E−07 | −0.00189 0 |

The image capturing lens assembly has satisfied the condition: 20<V1/N1<35. Therefore, the image capturing lens has a shortened total axial length.

The third lens has a convex surface facing the image side of the image capturing lens assembly and the image capturing lens assembly has satisfied the conditions: 0.967≤f3/f4<−0.5, 0.15<BFL/TTL≤0.218 and −2<f/f6≤−0.991. Thus, the image capturing lens has an effectively aberration correction and an improved resolution.

The invention being thus described, it will be clear that the same may be varied in many ways. Such variations are not to be regarded as a departure from the spirit and scope of the invention, and all such modifications as would be obvious to one skilled in the art are intended to be included within the scope of the following claims.

What is claimed is:

1. An image capturing lens assembly comprising, in an order from an object side to an image side thereof:
   a first lens element with refractive power, wherein $20 < V1/N1 < 35$, where V1 is an Abbe number of the first lens element to d light, and N1 is a refractivity of the first lens element to d light, wherein d light is a light with a wavelength of 587.6 nm; a second lens element with refractive power;
   a third lens element with positive refractive power and having a convex surface facing the image side of the image capturing lens assembly;
   a fourth lens element with refractive power;
   a fifth lens element with refractive power; and
   a sixth lens element with refractive power,
   wherein $-2 < f/f6 \leq -0.991$, where f is a focal length of said lens assembly, and f6 is a focal length of said sixth lens element, and
   wherein the fifth lens element is a meniscus lens with a convex surface facing the image side and a concave surface facing the object side.

2. The image capturing lens assembly according to claim 1, wherein $-0.01 \text{ mm}^{-1} < 1/R5 < 0.2 \text{ mm}^{-1}$, where R5 is a curvature radius of a surface of said third lens element that is opposite to the convex surface of said third lens element.

3. The image capturing lens assembly according to claim 1, wherein the surface of said third lens element that is opposite to the convex surface of said third lens element includes a concave surface.

4. The image capturing lens assembly according to claim 1, wherein the third lens element further includes a convex surface facing the object side, the convex surface of the object side includes one inflection point.

5. The image capturing lens assembly according to claim 4, wherein the inflection point is located between the optical axis and an edge of said third lens element.

6. The image capturing lens assembly according to claim 1, wherein the first lens element is a meniscus lens, the second lens element is a meniscus lens, the fourth lens element is a meniscus lens, and the sixth lens element is a concave-concave lens.

7. The image capturing lens assembly according to claim 1, wherein a refractive power of the first lens element is positive, a refractive power of the second lens element is negative, a refractive power of the fourth lens element is negative, a refractive power of the fifth lens element is positive, and a refractive power of the sixth lens element is negative.

8. The image capturing lens assembly according to claim 1, wherein $-0.967 \leq f3/f4 < -0.5$, where f3 is a focal length of the third lens element, and f4 is a focal length of the fourth lens element.

9. The image capturing lens assembly according to claim 1, wherein $0.15 < BFL/TTL \leq 0.218$, where TTL is a distance along the optical axis from a surface of said first lens element that faces the object side of the image capturing lens assembly to an image sensor, and BFL is a distance along the optical axis from a surface of said sixth lens element that faces the image side of the image capturing lens assembly to the image sensor.

10. The image capturing lens assembly according to claim 1, wherein at least one of the third lens element, the fifth lens element and the sixth lens element has at least one aspheric surface.

11. An image capturing lens assembly, comprising in order from an object side to an image side thereof:
   a first lens element with positive refractive and a convex surface facing the object side of the image capturing lens assembly, wherein $20<V1/N1<35$, where V1 is an Abbe number of the first lens element to d light, and N1 is a reflectivity of the first lens element to d light, wherein d light is a light with a wavelength of 587.6 nm;
   a second lens element with refractive power;
   a third lens element with refractive power;
   a fourth lens element with refractive power, wherein a concave surface that faces the object side of the image capturing lens assembly and a convex surface that is opposite to the concave surface;
   a fifth lens element with positive refractive power; and
   a sixth lens element with negative refractive power, wherein a concave surface that faces the image side of the image capturing lens assembly, the concave surface has at least one inflection point and the sixth lens element has at least one aspheric surface,
   wherein $-2<f/f6\leq-0.991$, where f is a focal length of said lens assembly, and f6 is a focal length of said sixth lens element, and
   wherein the fifth lens element is a meniscus lens with a convex surface facing the image side and a concave surface facing the object side.

12. The image capturing lens assembly according to claim 11, wherein said first lens element is made of glass and has a surface that is opposite to the convex surface of the first lens element.

13. The image capturing lens assembly according to claim 11, wherein the concave surface of said sixth lens element has an inflection point between the optical axis and an edge of said sixth lens element.

14. The image capturing lens assembly according to claim 11, further comprises: a stop located between an end of the image capturing lens assembly at the object side and said first lens element.

15. An image capturing lens assembly, comprising in order from an object side to an image side:
   a first lens element with positive refractive;
   a second lens element with refractive power;
   a third lens element with refractive power;
   a fourth lens element with refractive power;
   a fifth lens element with refractive power; and
   a sixth lens element with refractive power, wherein $20<V1/N1<35$, $0.15<BFL/TTL\leq0.218$, $-2<f/f6\leq-0.991$, and $-0.967\leq f3/f4<-0.5$, where V1 is an Abbe number of said first lens element to d light, N1 is a refractivity of said first lens element to d light, wherein d light is a light with a wavelength of 587.6 nm, TTL is a distance along the optical axis from a surface of said first lens element that faces the object side of the image capturing lens assembly to an image sensor, BFL is a distance along the optical axis from a surface of said sixth lens element that faces the image side of the image capturing lens assembly to the image sensor, f is a focal length of said lens assembly, f6 is a focal length of said sixth lens element, f3 is a focal length of the third lens element, and f4 is a focal length of the fourth lens element, and
   wherein the fifth lens element is a meniscus lens with a convex surface facing the image side and a concave surface facing the object side.

16. An image capturing lens assembly in an order along an optical axis from an object side to an image side thereof, comprising:
   a first lens element with refractive power;
   a second lens element with refractive power;
   a third lens element with positive refractive power and having a convex surface facing the image side of the image capturing lens assembly, and having a concave surface that is opposite to the convex surface, wherein $20<V1/N1<35$, where V1 is an Abbe number of the first lens element to d light, and N1 is a refractivity of the first lens element to d light, wherein d light is a light with a wavelength of 587.6 nm;
   a fourth lens element with refractive power;
   a fifth lens element with refractive power; and
   a sixth lens element with refractive power, wherein $0.15<BFL/TTL\leq0.218$, where TTL is a distance along the optical axis from a surface of said first lens element that faces the object side of the image capturing lens assembly to an image sensor, and BFL is a distance along the optical axis from a surface of said sixth lens element that faces the image side of the image capturing lens assembly to the image sensor,
   wherein $-2<f/f6\leq-0.991$, where f is a focal length of said lens assembly, and f6 is a focal length of said sixth lens element, and
   wherein the fifth lens element is a meniscus lens with a convex surface facing the image side and a concave surface facing the object side.

17. The image capturing lens assembly according to claim 16, wherein a concave surface of said second lens element that faces the image side of the image capturing lens assembly, said the concave surface of said second lens element is at the object side of said concave surface of said third lens element, a concave surface of said fourth lens element that faces the object side of the image capturing lens assembly, and said the concave surface of said fourth lens element is at the image side of said convex surface of said third lens element.

18. The image capturing lens assembly according to claim 17, wherein the sixth lens element further includes a concave surface facing the image side, the concave surface of said sixth lens element includes one inflection point.

19. The image capturing lens assembly according to claim 18, wherein the infection point is located between the optical axis and an edge of the sixth lens element.

* * * * *